US012179218B2

(12) United States Patent
Ran et al.

(10) Patent No.: US 12,179,218 B2
(45) Date of Patent: Dec. 31, 2024

(54) EASY-TO-CLEAN SEPARABLE PURIFICATION CORE

(71) Applicant: SUZHOU BEIANG TECHNOLOGY LTD., Suzhou (CN)

(72) Inventors: Hongyu Ran, Suzhou (CN); Yigang Liu, Suzhou (CN); Yaoyuan Lu, Suzhou (CN)

(73) Assignee: SUZHOU BEIANG TECHNOLOGY LTD., Suzhou (CN)

( * ) Notice: Subject to any disclaimer, the term of this patent is extended or adjusted under 35 U.S.C. 154(b) by 332 days.

(21) Appl. No.: 16/805,721

(22) Filed: Feb. 29, 2020

(65) Prior Publication Data

US 2020/0197952 A1 Jun. 25, 2020

Related U.S. Application Data

(63) Continuation of application No. PCT/CN2018/071752, filed on Jan. 8, 2018.

(30) Foreign Application Priority Data

Sep. 1, 2017 (CN) ........................ 201710780572.X

(51) Int. Cl.
*B03C 3/08* (2006.01)
*B03C 3/47* (2006.01)
(Continued)

(52) U.S. Cl.
CPC .................. *B03C 3/08* (2013.01); *B03C 3/47* (2013.01); *B03C 3/64* (2013.01); *B03C 3/74* (2013.01)

(58) Field of Classification Search
CPC ......... B03C 2201/28; B03C 3/74; B03C 3/47; B03C 3/45; B03C 3/08; B03C 3/64;
(Continued)

(56) References Cited

U.S. PATENT DOCUMENTS 4,673,416 A * 6/1987 Sakakibara ............... B03C 3/66 96/79
4,789,801 A * 12/1988 Lee ......................... F04D 33/00 323/903

(Continued)

FOREIGN PATENT DOCUMENTS

CN 104907173 B * 9/2017 ............... B03C 3/08
CN 112833510 A * 5/2021

(Continued)

*Primary Examiner* — Christopher P Jones
*Assistant Examiner* — Sonji Turner
(74) *Attorney, Agent, or Firm* — Syncoda LLC; Feng Ma

(57) ABSTRACT

An easy-to-clean separable purification core for an air purifier includes an inner cavity lining body, a collector module and a repeller module that are detachably inserted one in the other. The collector module includes a first collector cell and a second collector cell that are nested from top to bottom and are detachable with respect to each other, the two collector cells match each other in shape and dimension size and are respectively provided with collector pieces parallel to each other, and the spacing between two adjacent collector pieces in each collector cell is four times of an original spacing. In an assembly state of the purification core, the collector module, the repeller module, and the inner cavity lining body are nested one in another to form an integral component.

18 Claims, 5 Drawing Sheets

(51) Int. Cl.
*B03C 3/64* (2006.01)
*B03C 3/74* (2006.01)

(58) Field of Classification Search
CPC .. B03C 3/017; B03C 3/78; B03C 3/34; B03C 3/32; B03C 3/04; B03C 3/01; B03C 3/025; F24C 15/2035; F24C 7/003; F24C 8/192; F24C 8/194
See application file for complete search history.

(56) References Cited

U.S. PATENT DOCUMENTS

| | | | | |
|---|---|---|---|---|
| 7,077,890 | B2 * | 7/2006 | Botvinnik | B03C 3/60 422/186.04 |
| 7,291,207 | B2 * | 11/2007 | Taylor | B03C 3/41 422/186.04 |
| 7,311,762 | B2 * | 12/2007 | Taylor | B03C 3/32 422/186.04 |
| 7,318,856 | B2 * | 1/2008 | Taylor | B03C 3/68 422/186.04 |
| 7,517,505 | B2 * | 4/2009 | Botvinnik | B03C 3/08 422/186.04 |
| 7,833,323 | B2 * | 11/2010 | Takayanagi | B03C 3/88 96/24 |
| 7,897,118 | B2 * | 3/2011 | Taylor | B01D 53/32 422/186 |
| 7,959,718 | B2 * | 6/2011 | Takayanagi | B03C 3/64 96/99 |
| 8,192,535 | B2 * | 6/2012 | Tanaka | B03C 3/08 96/98 |
| 8,580,017 | B2 * | 11/2013 | Noh | B03C 3/47 96/87 |
| 8,657,937 | B2 * | 2/2014 | Motegi | B03C 3/08 96/87 |
| 9,308,537 | B2 * | 4/2016 | Krichtafovitch | B03C 3/72 |
| 9,488,382 | B2 * | 11/2016 | Krichtafovitch | B03C 3/68 |
| 9,735,568 | B2 * | 8/2017 | Ran | A61L 9/22 |
| 9,868,123 | B2 * | 1/2018 | Liu | B03C 3/12 |
| 10,668,483 | B2 * | 6/2020 | Krichtafovitch | B03C 3/08 |
| 10,744,516 | B2 * | 8/2020 | Hu | B03C 3/08 |
| 2006/0016333 | A1 * | 1/2006 | Taylor | B03C 3/74 95/76 |
| 2006/0016336 | A1 * | 1/2006 | Taylor | B03C 3/68 96/25 |
| 2006/0018807 | A1 * | 1/2006 | Taylor | A61L 9/22 422/186.04 |
| 2013/0298773 | A1 * | 11/2013 | Yamagishi | G03B 21/16 96/15 |
| 2015/0013541 | A1 * | 1/2015 | Vandenbelt | B03C 3/47 96/98 |
| 2015/0174587 | A1 * | 6/2015 | Wei | B03C 3/08 96/92 |
| 2015/0360233 | A1 * | 12/2015 | Vanella | B03C 3/09 96/54 |
| 2016/0089470 | A1 * | 3/2016 | Ran | A61L 9/22 315/111.91 |
| 2018/0250685 | A1 * | 9/2018 | Noh | B03C 3/12 |
| 2020/0179946 | A1 * | 6/2020 | Yu | B03C 3/82 |

FOREIGN PATENT DOCUMENTS

| | | | | | |
|---|---|---|---|---|---|
| DE | 2146288 | A1 | * | 3/1973 | B03C 3/08 |
| DE | 102017204059 | A1 | * | 9/2018 | B03C 3/08 |
| DE | 102017209117 | A1 | * | 12/2018 | B03C 3/08 |
| DE | 102018201053 | A1 | * | 7/2019 | B03C 3/08 |
| WO | WO-0127965 | A1 | * | 4/2001 | H01J 49/04 |

* cited by examiner

EASY-TO-CLEAN SEPARABLE PURIFICATION CORE

CROSS-REFERENCE TO RELATED APPLICATIONS

The present application is a continuation of International Application No. PCT/CN2018/071752 filed on Jan. 8, 2018, which claims the priority to Chinese Patent Application No. 201710780572.X filed on Sep. 1, 2017. The disclosures of these applications are hereby incorporated by reference in their entirety.

BACKGROUND

Electrostatic dust collection technology is an important environmental protection technology for controlling air pollution and smog. Its basic principle is to use high-voltage discharge, generate an electric field, and adsorb particles so as to achieve the effect of electrostatic dust removal. Compared with conventional physical filter dust removal technology, electrostatic dust collection technology has the advantages of using no disposables and lower maintenance costs, hence it is very suitable for addressing issues of high pollution and smoggy environments.

SUMMARY

Various embodiments of the present disclosure relate to an air purifier, in particular to an easy-to-clean separable purification core, and generally to the technical field of air purification.

The easy-to-clean separable purification can solve various problems in the related technologies.

The purification core can be disposed in an air purifier, the purification core including of an inner cavity lining body as well as a collector module and a repeller module therein detachably connected with each other, wherein

- the collector module comprises a first collector unit and a second collector unit vertically nested and assembled and detachable from each other, the two collector units are each provided with parallel collector pieces, and spacing between two adjacent collector pieces of each collector unit is 4a;
- the repeller module is an integrally molded structure and is fixedly connected opposite to the inner cavity lining body, the repeller module is provided with a holding chamber for inserting the corresponding collector module therein, parallel repeller pieces corresponding to a total number of the collector pieces are provided in the holding chamber, and spacing between two adjacent repeller pieces is 2a; and
- when the purification core is in an assembled state, the collector module, the repeller module and the inner cavity lining body are nested to form an integral body, and the collector pieces and the repeller pieces are provided sequentially at spacing a, wherein a is the grid spacing constant of the air purifier.

In some embodiments, the collector module is made of amorphous and hydrophobic conductive plastic having a surface resistivity less than $10^6\Omega$.

In some embodiments, the collector pieces in the collector module are integrally injection-molded into shape with the first collector unit or the second collector unit to which the collector pieces belong.

In some embodiments, the collector module is made of a metal material having a surface resistivity less than $10^6\Omega$.

In some embodiments, the repeller module is made of a metal or nonmetal conductive material having a surface resistivity less than $10^6\Omega$.

In some embodiments, outer ends of two sides of each of the repeller pieces are sleeved by thermally shrinkable insulating sleeves.

In some embodiments, the color of the inner cavity lining body and the repeller module is different from the color of the collector module.

In some embodiments, handles are provided on two sidewalls of the first collector unit, and handle buckles matched and clamped with the handles are provided on two sidewalls of the inner cavity lining body.

In some embodiments, at least two reinforcing ribs for deformation prevention and reinforcement are provided on surfaces of the collector pieces of the first collector unit, and the at least two reinforcing ribs for deformation prevention and reinforcement are provided on surfaces of the collector pieces of the second collector unit.

It is to be understood that both the foregoing general description and the following detailed description are exemplary and explanatory only and are not restrictive of the present disclosure.

BRIEF DESCRIPTION OF THE DRAWINGS

The accompanying drawings herein which are incorporated into and constitute part of the description, illustrate embodiments according to the present disclosure, and serve to explain principles of the present disclosure together with the description.

DETAILED DESCRIPTION

The purposes, advantages, and features of the present disclosure will be illustrated and explained below by way of non-limiting descriptions of the preferred embodiments. These embodiments are only typical examples for applying the technical solutions of the present disclosure, and any technical solutions formed by equivalent replacement or equivalent changes are within the protection scope of the present disclosure.

Figure 1:
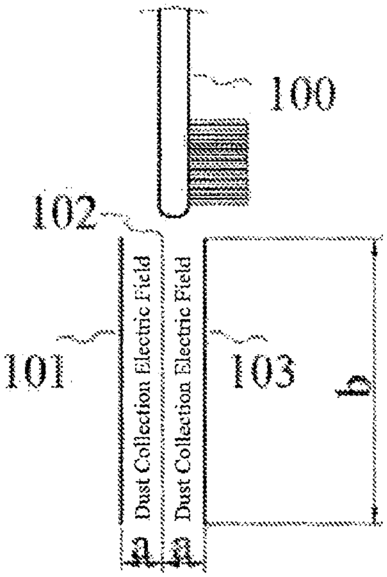
FIG. 1 (PRIOR ART)
FIG. 1 is a schematic structural diagram of a collector piece and a repeller piece in the prior art.

The conventional electrostatic dust collection pole (collector) pieces are mostly made of metal and are rarely made of conductive plastic. The spacing between these pieces is very small, and the metal collector piece is particularly heavy, making it difficult for users to clean the collector pieces. When a collector module needs to be cleaned after a period of use, the case is as illustrated in FIG. 1 below. As illustrated in the schematic structural diagram of a collector piece and a repeller piece of FIG. 1, in the cleaning process, it is difficult for a brush 100 to extend into the space between the repeller piece 102 and the collector piece 103. Since the grid spacing constant a therebetween is generally only 6 mm to 8 mm, and the width b of the piece is relatively large, thus it is more difficult to clean the collector plate, and user experience is negatively impacted.

Figure 2:
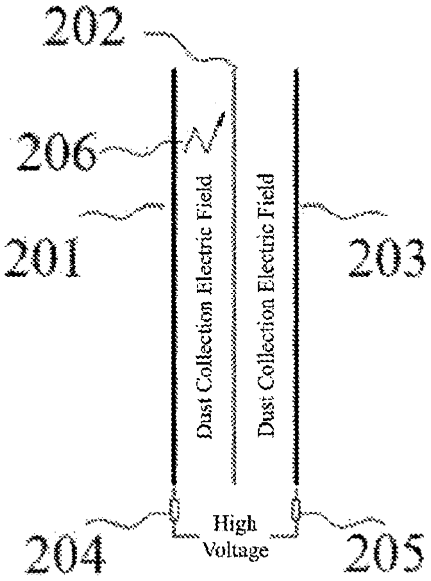
FIG. 2 (PRIOR ART)
FIG. 2 is a schematic structural diagram of a collector piece, a repeller piece, and resistors.

Most users choose to rinse the collector pieces with water, causing many of the dust particles to remain adhered to the collector pieces 101 and collector pieces 103, which is equivalent to a large electrical resistance connected in series with the collector pieces 101 and the collector pieces 103. As illustrated in the schematic structural diagram of a collector piece of FIG. 2, a repeller piece and a resistor, and equivalently a resistor 204 and a resistor 205 are connected in series onto the collector pieces 201 and collector pieces 203. After applying the same high voltage to the two ends of the collector pieces 201 and the collector pieces 203, the resistor 204 and the resistor 205 will partially split the high voltage, so as to lower the intensity of the generated repulsive electric field, thereby greatly affecting electrostatic dust collection efficiency. At the same time, after the dust particles are adhered to the collector piece 201, it is very easy to cause a tip discharge phenomenon 206 between the collector piece 201 and the repeller piece 202, thereby generating a severe "sizzling" discharge sound, which is unfavorable for the generator electrode and the collector piece.

In addition, since conventional collector pieces are inseparable during cleaning, a large amount of water stains remain in the structure of the collector module, causing the air-drying speed of the collector module to be especially slow. Moreover, in order to reduce the weight, conventional metal collector pieces mostly adopt a relatively light-weight aluminum material having hydrophilicity and to which water droplets easily adhere. This affects the air-drying speed of the collector module to some extent. Further, alkaline is the most commonly used liquid for cleaning, which will chemically react with the surface of the aluminum sheet, destroy the surface structure of the collector pieces, and reduce conductivity thereof, thereby affecting the dust collection efficiency of the module.

Figure 3:
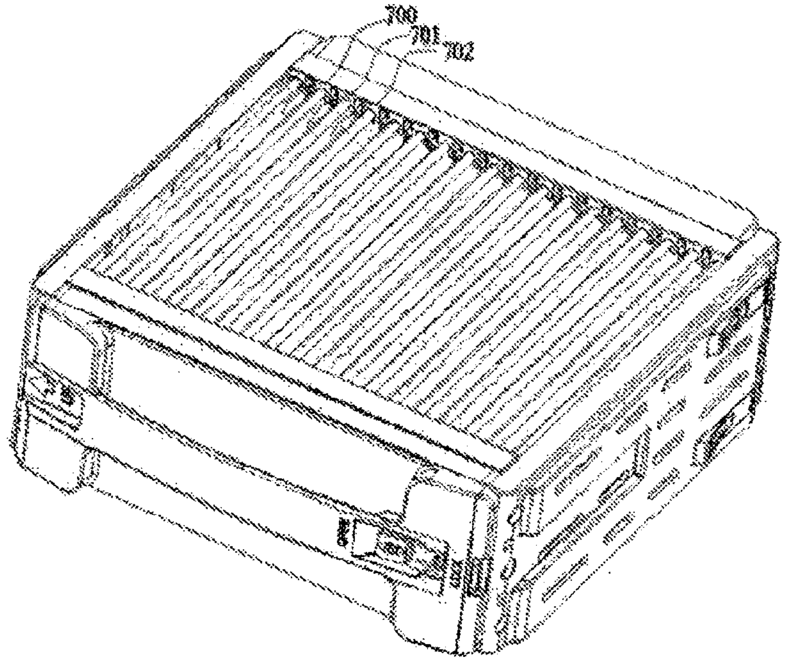
FIG. 3 (PRIOR ART)
FIG. 3 is a schematic structural diagram of a collector module.

FIG. 3 illustrates a non-removable collector module in the prior art. When collector pieces 700, collector pieces 701, collector pieces 702, etc., are cleaned during the cleaning process, a large amount of water stains remain on other structures of the collector module, the air-drying speed will be very slow, and about 15 hours is usually needed for air-drying. In order to solve the aforementioned defect wherein the spacing is small, some designers may make the value of a in FIG. 1 (the spacing between the collector piece and the repeller piece) greater than 10 mm, thus causing weakening of the intensity of the repulsive electric field and great reduction to dust collection efficiency. At the same time, it is not advisable to increase the intensity of the repulsive electric field only by increasing the value of the high voltage, because an overly high voltage value will greatly increase the risk of discharge between the pieces and weaken dust collection efficiency of the collector module.

Various embodiments of the present disclosure provide an easy-to-clean separable purification core, and can have one or more of the following advantages.

The embodiments of the present disclosure are exquisite in design and simple in structure. By designing a structure where the purification core is separable, the collector module is individually separated from the purification core for further separation; and the spacing between the finally separated collector pieces is four times the size of the original spacing, thereby avoiding difficulty in cleaning the collector plate and guaranteeing the dust removal efficiency.

When cleaning the collector piece, the user only needs to take out and clean the first collector unit and the second collector unit. Compared with the conventional collector module which needs to be cleaned as a whole, the air-drying speed of the collector pieces in the embodiment of the present disclosure is very fast. At the same time, the conductive plastic material used herein is hydrophobic, thus fewer water droplets will adhere to the surface of the collector piece, and the air-drying speed of the collector piece will further accelerate.

By using conductive plastic instead of metal material as the material of the collector piece, it is more convenient for users to clean the collector plate; the function of integrating many collector pieces into two collector units is implemented; and compared with the assembly method where the traditional plates are embedded one by one, the design structure in the embodiment of the present disclosure can greatly reduce the time and labor for assembly of the collector module, thereby reducing costs.

Figure 4:
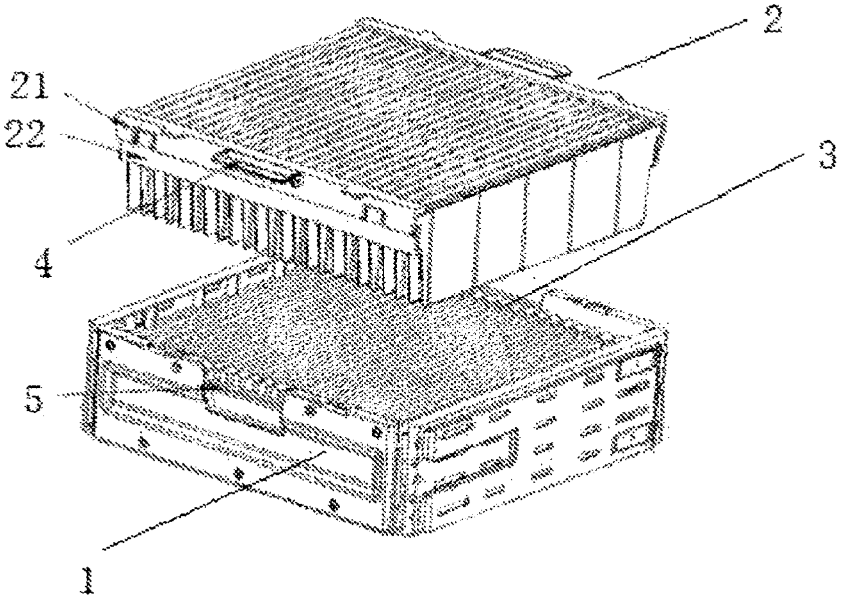
FIG. 4 is a schematic structural diagram of a separable purification core according to some embodiments of the present disclosure.

As illustrated in FIG. 4, the purification core is disposed in an air purifier, and the purification core includes of an inner cavity lining body 1 as well as a collector module 2 and a repeller module 3 therein detachably connected with each other in the inner cavity lining body 1. In the present technical solution, the inner cavity lining body 1 may be made of various known practical materials. In the present embodiment, the inner cavity lining body 1 is In some embodiments an elastic, foldable, and water-washable lining body, thereby facilitating the packaging, transportation, and storage thereof. The material of the inner cavity lining body 1 is a silicone electrical insulating rubber having great advantages such as processing plasticity, high voltage breakdown resistance, as well as desirable electrical insulation, electrical corrosion resistance, water resistance, antistatic performance, corona resistance, electric burning resistance, and flame retardancy. Its tracking resistance level reaches 1A4.5, and when in use, it can be conveniently disassembled and washed using water, and the insulating performance is good.

Figure 5:
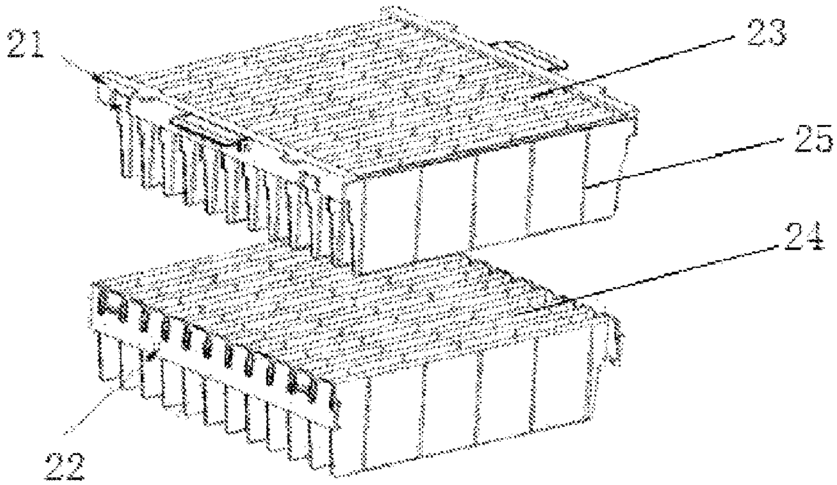
FIG. 5 is a schematic structural diagram of a first collector unit and a second collector unit in a collector module according to some embodiments of the present disclosure.

As illustrated in FIG. 5, the collector module 2 comprises a first collector unit 21 and a second collector unit 22 vertically nested and assembled and detachable from each other, the two collector units are provided with the same number of parallel collector pieces, and spacing between two adjacent collector pieces in each collector unit is 4a. In the present embodiment, the shape and width of the two collector units match, and the two collector units are preferably provided with the same number of parallel collector pieces.

Figure 6:
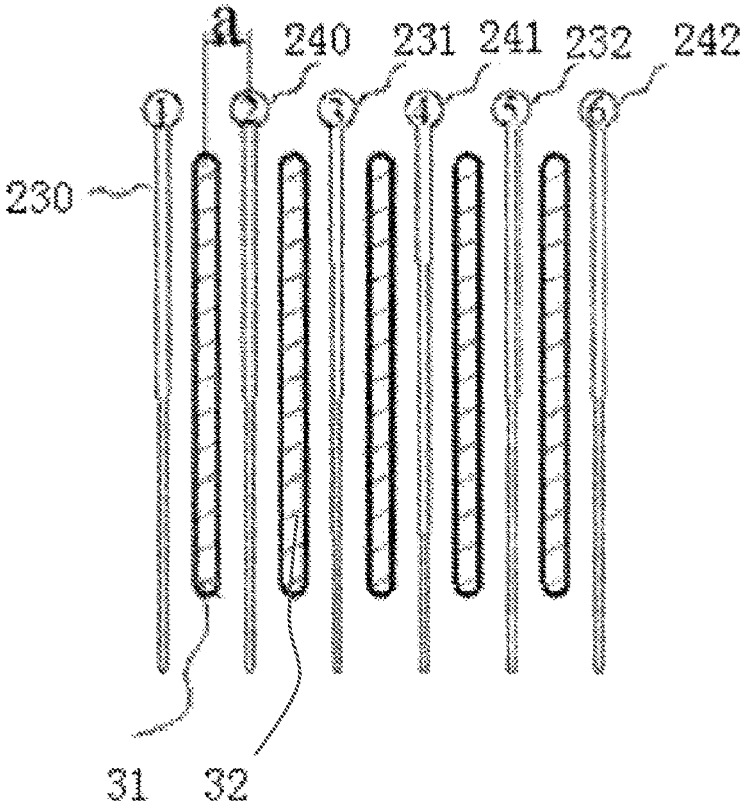
FIG. 6 is a schematic diagram illustrating the original spacing between the collector pieces and the repeller pieces in a separable purification core according to some embodiments of the present disclosure.

Specifically, at least ten first collector pieces 23 are provided in a spaced manner on the first collector unit 21, the first collector pieces 23 are provided in parallel with each other, and the spacing between adjacent first collector pieces 23 is 4a. In the present technical solution, as illustrated in FIG. 6, first collector piece 230, first collector piece 231, and first collector piece 232 are preferably provided in a spaced manner on the first collector unit 21. In the present technical solution, the number of the first collector pieces is not specifically limited. At least two reinforcing ribs 25 for deformation prevention and reinforcement are provided on surfaces of the collector pieces 23 of the first collector unit 21.

At least ten second collector pieces 24 are provided in a spaced manner on the second collector unit 22, the second collector pieces 24 are provided in parallel with each other, and each spacing between adjacent second collector pieces 24 is 4a. In the present technical solution, as illustrated in FIG. 6, a first of the second collector piece 240, a second of the second collector piece 241, and a third of the second collector piece 242 are preferably provided in a spaced manner on the second collector unit 24. In the present technical solution, the number of the second collector pieces 24 is not specifically limited. Considering that the wall thickness of the collector piece is relatively small and warping deformation is easily caused during molding, it is necessary to add reinforcing ribs on the surface thereof. Specifically, at least two reinforcing ribs 25 for deformation prevention and reinforcement are provided on surfaces of the second collector pieces 24 of the second collector unit 22.

Further, as illustrated in FIG. 6, which is a schematic diagram illustrating the original spacing between the first collector pieces 23 and the repeller pieces 31 in the separable purification core, at this time the spacing between the repeller pieces 31 and the second collector pieces 24 is a.

Figure 7:
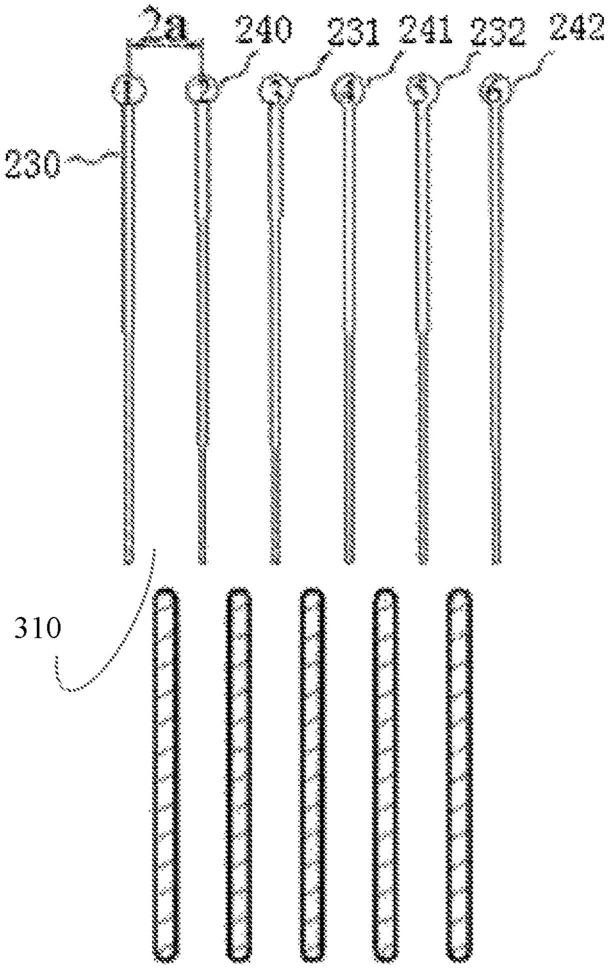
FIG. 7 is a schematic structural diagram of first collector pieces and second collector pieces when the collector module and the repeller module are separated according to some embodiments of the present disclosure.

As illustrated in FIG. 7, in the embodiment of the present disclosure, the collector module can be completely taken out of the purification core. At this time, the spacing between the first collector pieces 23 and the second collector pieces 24 is 2a.

Figure 8:
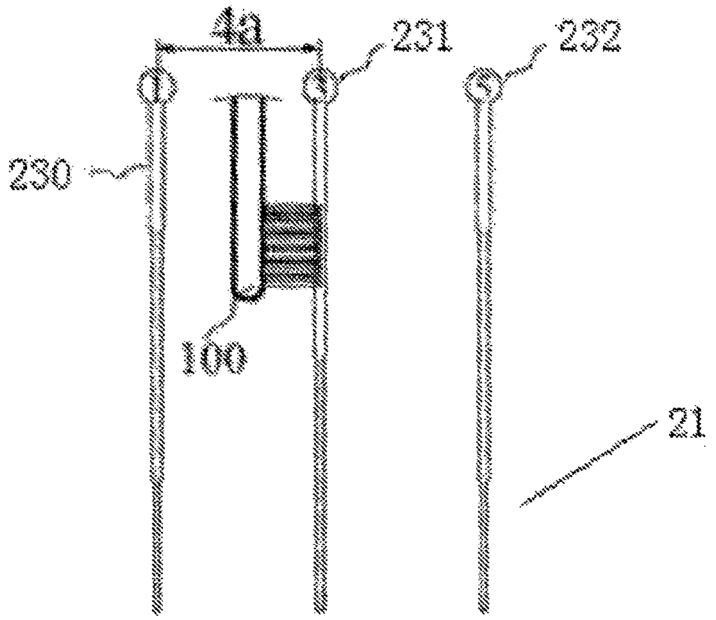
FIG. 8 is a schematic structural diagram of a first collector unit after the collector module is separated according to some embodiments of the present disclosure.
Figure 9:
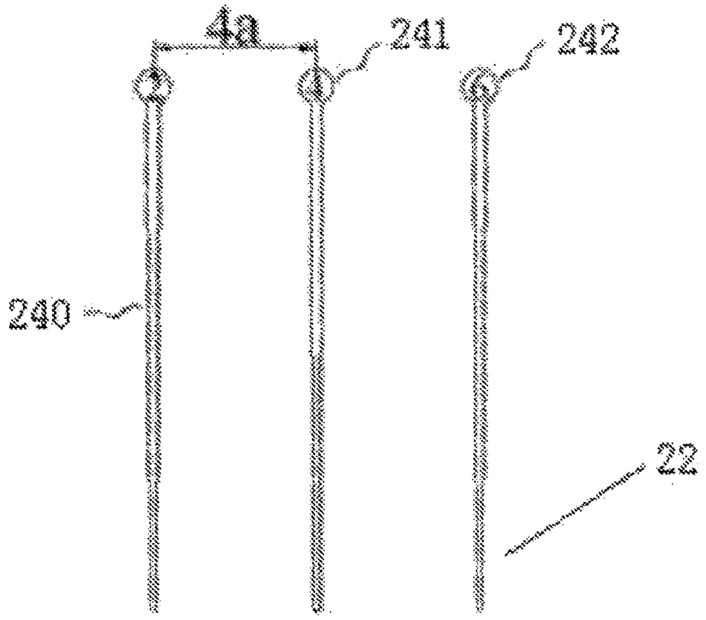
FIG. 9 is a schematic structural diagram of a second collector unit after the collector module is separated according to some embodiments of the present disclosure.

As illustrated in FIG. 8, the collector module may be further divided into a first collector unit and a second collector unit. At this time, the spacing between the first collector piece and the second collector piece is 4a. The first of the first collector piece 230, second of the first collector piece 231, and third of the first collector piece 232 belong to the first collector unit, and the first of the second collector piece 240, the second of the second collector piece 241, and the third of the second collector piece 242 belong to the second collector unit. Certainly, for both the first collector pieces and the second collector pieces, the spacing between the collector pieces is 4a. Compared with the spacing a in FIG. 1, a brush 100 can very easily extend into the spacing between the collector pieces to better clean the collector pieces.

The repeller module 3 is an integrally molded structure and is fixedly connected opposite to the inner cavity lining body 1, the repeller module 3 is provided with a holding chamber 310 for inserting the corresponding collector module therein, parallel repeller pieces 31 corresponding to a total number of the collector pieces are provided in the holding chamber, and spacing between two adjacent repeller pieces is 2a. The repeller module 3 is made of a metal or nonmetal conductive material having a surface resistance less than $10^6\Omega$. Outer ends of two sides of each of the repeller pieces are sleeved by thermally shrinkable insulating sleeves 32. The thermally shrinkable insulating sleeves 32 are provided in order to prevent tip discharge or prevent large particles from entering the dust collection electric field.

When the purification core is in an assembled state, the collector module 2, the repeller module 3 and the inner cavity lining body 1 are nested to form an integral body, and the first collector pieces 23 and the repeller pieces 31 are provided alternatively and sequentially at spacing a, wherein a is the grid spacing constant of the air purifier. Compared with the prior art, the weight of the purification core is much lighter, such that users can not only enjoy convenience in repair and maintenance, but also enjoy a greatly enhanced user experience.

Handles 4 are provided on two sidewalls of the first collector unit 21, and handle buckles 5 matched and clamped with the handles are provided on two sidewalls of the inner cavity lining body 1. When the collector module 2 is disassembled, the user can conveniently completely remove the first collector unit 21 and the second collector unit 22 using the handles and the handle buckles. The handles are mounted on the first collector unit 21 through plastic rotating shafts.

When the collector module 2 is not disassembled, the handles are fastened tightly to the handle buckles. When the first collector unit 21 and the second collector unit 22 are disassembled, the handles can be pulled upwards from the two sides, so as to achieve the effect of disassembling the collector plate. That is to say, the stop ends of the handles will press against the positions of the ribs on the first collector unit, so that the first collector unit and the second collector unit can be conveniently and completely removed.

A large number of collector pieces are integrated on the first collector unit 21 and the second collector unit 22. The collector plate separated from the collector module 2 can be divided into the first collector unit 21 and the second collector unit 22 again, which can be realized through a clamping hook structure. A least ten guide ribs are provided on the sidewalls of the second collector unit 22. The arrangement of the guide ribs facilitates the assembly of the first collector unit 21 and the second collector unit 22.

In the present technical solution, the collector module 2 is made of amorphous and hydrophobic conductive plastic having a surface resistivity less than $10^6\Omega$. The collector pieces in the collector module 2 are integrally injection-molded into shape with the first collector unit 21 or the second collector unit 22 to which the collector pieces belong. The collector module 2 may also be made of metal. In some embodiments, the collector module 2 is made of a metal material having a surface resistivity less than $10^6\Omega$. The use of amorphous plastic can reduce the degree of deformation after injection molding. The amorphous plastic can be easily decorated and does not easily fall off. Its surface can absorb other molecules such as ink and paint. In addition, user safety while in use is fully considered. All materials of the collector module are fireproof, and users can trustingly and safely use the product.

For metal pieces, the atomic nuclei in the crystal structure are closely arranged, while the outer electrons are usually in a free state and easy flow directionally, so as to easily conduct electricity. The technical solution of the embodiment of the present disclosure adopts conductive plastic obtained by adding carbon fibers in ordinary high-quality plastic, and the conductivity can reach 103. In fact, carbon fiber has the hexahedral structure unit of graphite, and metallic electron gas exists on the two sides of a graphite layer structure. Under the effect of potential difference, motion will be generated. With such a large number of carriers during the generation of electron flow, electricity can naturally be conducted by the metal pieces and conductive plastic pieces. Under the condition of high voltage, the conductivity of the metal pieces and the conductivity of the conductive plastic pieces are almost identical. As further proven by experiments, after plastic collector pieces are adopted, compared with metal pieces, the dust collection efficiency of the entire collector module is not affected.

The color of the inner cavity lining body 1 and the repeller module 3 is different from the color of the collector module 2. Specifically, this arrangement is to facilitate proper cleaning of the removable purification core correctly by the user during cleaning. In the present technical solution, the color of the inner cavity lining body and the repeller module is preferably green, and the color of the collector module is preferably black, so that in the cleaning process, the user can visually and correctly distinguish which part to clean according to the color. If the color is designed to be the same, the user will not easily distinguish the inner cavity body, the repeller module, and the collector module in the cleaning process, resulting in poor user experience. Certainly, in the present technical solution, the colors of the inner cavity lining body, the repeller module and the collector module are not specifically limited.

In the embodiments, the first collector unit 21 and the second collector unit 22 can be separated from the collector module, as illustrated in FIG. 5. Therefore, when the collector pieces are cleaned, only the two collector plates need to be taken out for cleaning. The defect where the conventional collector module (as illustrated in FIG. 3) needs to be cleaned as a whole and resulting in water stains remaining in the structure is not present. At the same time, the employed conductive plastic material is hydrophobic, and fewer water drops will adhere to the surface of the collector pieces, and the air-drying speed of the collector pieces will further accelerate. As measured in experiments, the collector pieces can be air-dried in about 30 min.

A comparative analysis was performed with respect to the performance of the conventional metal pieces (taking the lightest aluminum material as an example) and the conventional plastic pieces, and is listed in the following Table 1.

TABLE 1

| N/A | Conventional Metal Piece | Conventional Undetachable Conductive Plastic Piece | Embodiment of the Present Invention |
|---|---|---|---|
| Plate Material Density | $2.7 \times 10^3$ kg/m$^3$ | $1.3 \times 10^3$ kg/m$^3$ | $1.3 \times 10^3$ kg/m$^3$ |
| Maximum Cleaning Spacing | a | a | 4a |
| Dust Collection Efficiency | >95% | >95% | >95% |
| Collector Module Air-drying Time | About 15 h | About 5 h | About 30 min |
| Air-drying Speed | Very Slow | Slow | Very Fast |

The advantages of the embodiment of the present disclosure are as follows: a large number of collector pieces are integrated on two detachable collector plates, and the time and labor for assembly is greatly reduced compared with the conventional metal pieces; when the collector pieces are cleaned, only two collector plates need to be removed for cleaning, and no water stains remain in the structure, so that the collector plates can be quickly air-dried; at the same time, on the basis that the spacing between the assembled pieces is ensured to be unchanged (the dust collection efficiency is unchanged), the spacing between the disassembled collector pieces can reach four times the size of the original spacing, which makes it easier to clean the collector pieces; and in addition, since the density of the conductive plastic material is very low, users will experience comfortability when cleaning the collector pieces.

Various embodiments of the present disclosure can have one or more of the following advantages.

By designing a structure where the purification core is separable, the collector module is individually separated from the purification core for further separation, and the spacing between the finally separated collector pieces is four times the size of the original spacing, thereby avoiding difficulty in cleaning the collector plate, and guaranteeing dust removal efficiency. The user only needs to take out and clean the first collector unit and the second collector unit when cleaning the collector piece. Compared with the conventional collector module which needs to be cleaned as a whole, the air-drying speed of the collector piece in the embodiment of the present disclosure is very fast. At the same time, the employed conductive plastic material is hydrophobic, and fewer water droplets adhere to the surface of the collector piece, hence the air-drying speed of the collector piece is further accelerated. By using conductive plastic instead of metal material as the material of the collector piece, it is more convenient for users to clean the collector plate; the function of integrating many collector pieces into two collector units is implemented; and compared with the assembly method in which the conventional plates are embedded one by one, the design structure in the embodiment of the present disclosure can greatly reduce the time and labor for assembly of the collector module, thereby reducing costs.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" or "units" in general. In other words, the "components," "modules," "blocks," "portions," or "units" referred to herein may or may not be in modular forms.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A separable purification core for an air purifier, comprising:

an inner cavity lining body;

a collector module; and a repeller module disposed in the collector module, detachably connected with the collector module, wherein the collector module comprises a first collector unit and a second collector unit assembled along at least ten guide ribs on sidewalls of the second collector unit;

the first collector unit comprising at least ten first collector pieces in parallel with each other with a spacing between two adjacent first collector pieces of 4$\alpha$ along a plane, and the second collector unit comprising at least ten second collector pieces in parallel with each other with a spacing between two adjacent second collector pieces of 4$\alpha$ along the plane, wherein $\alpha$ is a grid spacing constant of the air purifier;

the repeller module is an integrally molded structure and is fixedly connected adjacent to the inner cavity lining body;

the repeller module is provided with a holding chamber for inserting the collector module therein, parallel repeller pieces corresponding to the at least ten first collector pieces and the at least ten second collector pieces are provided in the holding chamber, and a spacing between two adjacent repeller pieces is 2$\alpha$;

when the purification core is in an assembled state, the collector module, the repeller module, and the inner cavity lining body form an integral body;

the at least ten first collector pieces and the at least ten second collector pieces, and the repeller pieces are provided alternatingly and sequentially at spacing $\alpha$;

from a connected configuration, the repeller module is vertically detachable completely from the collector module in parallel with the collector module in a vertical direction relative to the plane;

in the connected configuration two handles mounted on two sidewalls of the first collector unit through rotating shafts are matched and clamped with two handle buckles provided on two sidewalls of the inner cavity lining body; and the first collector unit and the second collector unit of the collector module are further completely separable in the vertical direction, facilitated by the two handles rotated into the plane around the rotating shafts, in parallel with each other from a vertically nested configuration.

2. The separable purification core according to claim 1, wherein the collector module is made of amorphous and hydrophobic conductive plastic having a surface resistance less than $10^6\Omega$.

3. The separable purification core according to claim 2, wherein the at least ten first collector pieces and the at least ten second collector pieces in the collector module are integrally injection-molded into shape with the first collector unit or the second collector unit.

4. The separable purification core according to claim 1, wherein the collector module is made of a metal material having a surface resistance less than $10^6\Omega$.

5. The separable purification core according to claim 1, wherein the repeller module is made of a metal or nonmetal conductive material having a surface resistance less than $10^6\Omega$.

6. The separable purification core according to claim 1, wherein outer ends of two sides of each of the repeller pieces are sleeved by thermally shrinkable insulating sleeves.

7. The separable purification core according to claim 1, wherein a color of the inner cavity lining body and the repeller module is different from a color of the collector module.

8. The separable purification core according to claim 1, wherein at least two reinforcing ribs for deformation prevention and reinforcement are provided on surfaces of the at least ten first collector pieces of the first collector unit, and the at least two reinforcing ribs for deformation prevention and reinforcement are provided on surfaces of the at least ten second collector pieces of the second collector unit.

9. An air purifier comprising the separable purification core according to claim 1, wherein the collector module is individually separable from the purification core for further separation; and a spacing between finally separated collector pieces is four times a size of an original spacing, thereby avoiding difficulty in cleaning the collector plate and guaranteeing the dust removal efficiency.

10. The air purifier of claim 9, wherein the collector module is composed of a conductive plastic material that is hydrophobic, thereby reducing water droplets adhering to a surface of the at least ten first collector pieces and the at least ten second collector pieces, and improving air-drying speed of the at least ten first collector pieces and the at least ten second collector pieces.

11. The air purifier of claim 10, wherein the at least ten first collector pieces and the at least ten second collector pieces are integrated into only two collector units of the air purifier, to thereby reduce time and labor for assembly of the collector module.

12. An air purifying system comprising a plurality of separable purification cores according to claim 1, wherein the collector module is made of amorphous and hydrophobic conductive plastic having a surface resistance less than $10^6\Omega$.

13. The air purifying system according to claim 12, wherein the at least ten first collector pieces and the at least ten second collector pieces in the collector module are integrally injection-molded into shape with the first collector unit or the second collector unit to which the at least ten first collector pieces and the at least ten second collector pieces belong.

14. The air purifying system according to claim 12, wherein the collector module is made of a metal material having a surface resistance less than $10^6\Omega$.

15. The air purifying system according to claim 12, wherein the repeller module is made of a metal or nonmetal conductive material having a surface resistance less than $10^6\Omega$.

16. The air purifying system according to claim 12, wherein outer ends of two sides of each of the repeller pieces are sleeved with thermally shrinkable insulating sleeves.

17. The air purifying system according to claim 12, wherein a color of the inner cavity lining body and the repeller module is different from a color of the collector module.

18. The air purifying system according to claim 12, wherein at least two reinforcing ribs for deformation prevention and reinforcement are provided on surfaces of the at least ten first collector pieces of the first collector unit, and the at least two reinforcing ribs for deformation prevention and reinforcement are provided on surfaces of the at least ten second collector pieces of the second collector unit.

* * * * *